Sept. 9, 1941.  W. G. CURRENT  2,255,504

METHOD OF MAKING LAMINATED PACKING

Filed June 26, 1940

INVENTOR
Wertus G. Current,
BY Fraser, Myers & Manley,
ATTORNEYS.

Patented Sept. 9, 1941

2,255,504

UNITED STATES PATENT OFFICE 2,255,504

METHOD OF MAKING LAMINATED PACKING

Wertus G. Current, Palmyra, N. Y., assignor to The Garlock Packing Company, Palmyra, N. Y., a corporation of New York Application June 26, 1940, Serial No. 342,411

2 Claims. (Cl. 154—33.1)

This invention relates to an improved method of making laminated machinery packing rings.

The production of machinery packing rings in accordance with a method well known in the art, which consists in building up a relatively large slab of laminated material comprising fibrous fabric and a vulcanizable binding agent, pressing the slab and vulcanizing it to a desired degree of hardness, and then stamping therefrom the rings intended to serve as packing elements, results in a relatively large degree of waste because of the material stamped from the centers of the rings as well as that lying between the rings produced from the slab.

Obviously, the rings of material might be stamped from the laminated slab before vulcanizing the same, after which the stamped rings might be molded and vulcanized, but this would not materially affect the waste which results from the use of any such method.

It is an object of the invention to produce packing rings comprising parallel layers of fabric having their contacting faces perpendicular to the axis of the ring, by a process consisting in producing an annular blank comprising a strip of fibrous material treated with a curable binding agent and spirally coiled into a roll of which the respective layers extend axially, then deforming the material of the blank by bending each part thereof through an angle of 90 degrees to positions such that the contacting surfaces of its laminations will lie in parallel planes perpendicular to the axis of the resulting annular structure, and then molding and curing the ring of deformed material to convert it into a unitary packing element of appropriate form, size and hardness, whereby rings of any desired number may be constructed from the fabric used, with substantially no waste of such material.

In the accompanying drawing to be referred to as an aid in describing the herein-disclosed method of manufacturing packing rings as distinguished from methods which have been practiced in the prior art, Figure 1 is a perspective view of a slab of material indicating the manner in which a plurality of rings may be stamped from a unitary structure.

Figure 1:
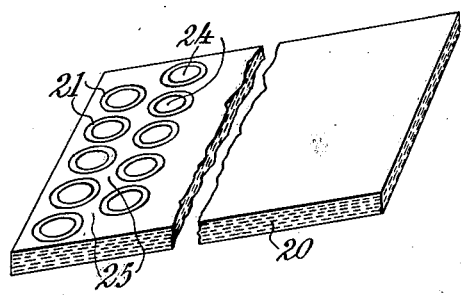

In accordance with the method, herein referred to, of producing laminated machinery packing rings by stamping them from a built-up slab of material, it has been the practice to first build up the laminated slab 20, Fig. 1, by superimposing, one upon another, a plurality of layers of fibrous fabric which may previously have been saturated with an unvulcanized rubber composition or some other appropriate binding agent.

Figure 2:
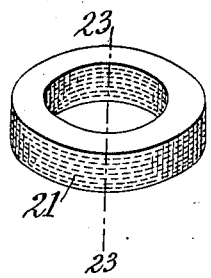
Fig. 2 is a perspective view, drawn to a larger scale, illustrating one of the packing rings of the prior art which may be stamped from the slab shown in Fig. 1.
Figure 3:
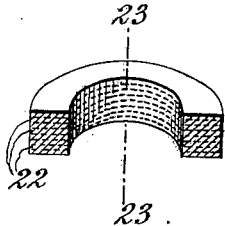
Fig. 3 is a perspective view, partly shown in cross section, more clearly illustrating the internal structure of the packing ring represented by Fig. 2.

After subjecting the slab illustrated by Fig. 1 to pressure and to a vulcanizing or other curing treatment to reduce it to a unitary structure of suitable hardness, it has been the practice to stamp the desired packing rings 21 therefrom, one such ring being illustrated on a larger scale, in perspective, by Figs. 2 and 3. As most clearly appears in Fig. 3, the layers of the laminated structure of the packing rings thus produced have their contacting surfaces in spaced parallel planes 22, each of which is perpendicular to the axis 23, 23 of the ring.

As will be apparent, the manufacture of laminated packing rings in accordance with this well-known method of the prior art results in a relatively large degree of waste since little or no use can be made of the material 24 stamped from the centers of the rings (see Fig. 1) or of the material 25 stamped from parts of the slab of material surrounding and intervening between the rings.

As has already been explained, rings produced in accordance with this well-known method of the prior art may, if desired, be stamped from the slab before the slab is vulcanized, after which the rings may be compressed or molded to appropriate form and hardened by vulcanization, but this modification of the above-described method would not materially affect the amount of material which would necessarily be wasted.

Figure 4:
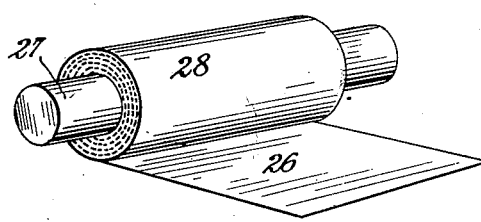
Fig. 4 illustrates in perspective a roll of laminated material resulting from the spiraling of fibrous fabric, treated with a suitable curing agent, about a mandrel as the first step of the novel method herein to be disclosed and claimed.
Figure 5:
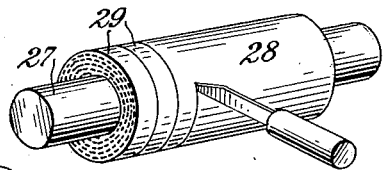
Fig. 5 is a perspective view which illustrates the manner in which a roll of material, such as is shown in Fig. 4, may be cut into a plurality of blanks from which packing rings may be made.
Figure 6:
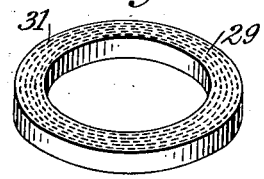
Fig. 6 is a large-scale perspective view of one of the blanks produced from the roll illustrated by Figs. 4 and 5.
Figure 7:
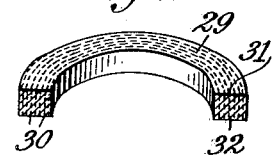
Fig. 7 is a perspective view partly shown in cross section to more clearly illustrate the internal construction of the ring represented by Fig. 6.

As a preliminary step in the manufacture of laminated packing rings in accordance with the invention herein disclosed and claimed, a strip of suitable fibrous fabric 26, Fig. 4, which may have been previously treated with vulcanizable rubber cement or other curable binding agent, may first be wound upon a mandrel 27 to produce a spirally coiled annular structure or roll 28 from which a plurality of blanks 29, Figs. 5, 6 and 7, may be cut by severing the roll in any appropriate manner into a plurality of rings of cross-sectional dimensions dependent upon the size of the ultimate packing ring to be produced.

The number of blanks produced from the roll 28 will, of course, depend upon the width of the strip of fabric 26 employed in the making of the roll and the relative size of the blanks which are cut therefrom.

On reference to Fig. 7 it will be apparent that the layers of fabric 30 of the annular blank 29 extend axially therein from one to the other of its lateral plane surfaces 31, 32, as distinguished from the relative positions of the layers 22 of the packing ring 21 (see Figs. 2 and 3) which are parallel to each other and perpendicular to the axis 23.

It is quite essential that the layers of a laminated packing ring intended for certain particular purposes, such, for example, as stuffing-box packings for piston rods, be disposed at right angles to the axis of the ring. It is of primary importance, therefore, when making packing rings in accordance with the herein-disclosed method, that the ring illustrated by Figs. 6 and 7 be converted in some practical manner into a ring having the laminations disposed as are the laminations of the ring 21 before it is molded to final form and vulcanized.

Figure 8:
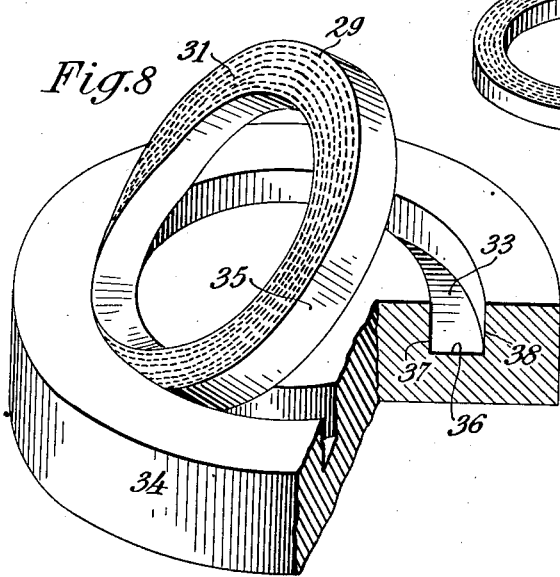
Fig. 8 is a perspective view, drawn to a larger scale than that of Figs. 6 and 7, illustrating the manner in which the ring shown in Fig. 6 may be deformed by inserting it in a mold, a portion of which is represented as having been broken away, the said mold forming part of the means whereby the ring may be compressed and vulcanized or otherwise cured.
Figure 9:
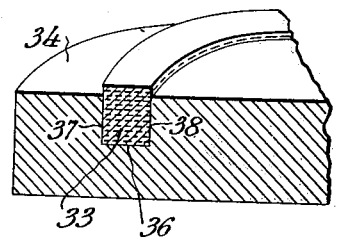
Fig. 9 is a perspective view of a portion of the mold illustrated by Fig. 8 having a part of a deformed blank inserted therein, portions of the mold and blank being shown in cross section to more clearly disclose their internal structure.

One satisfactory method of converting the blank illustrated by Fig. 6 into a ring having laminations disposed at an angle of 90 degrees with respect to their positions in the blank, as is indicated in the portion of the ring illustrated by Fig. 9, may be described with the aid of Fig. 8 of the drawing. As is therein clearly shown, a portion of the ring 29 is first inserted within a groove 33 in a mold 34, after which other parts of the ring may be successively pressed into the groove until the entire laminated structure has been deformed and assembled with the mold in the relative position indicated with respect to the fragment of the ring illustrated by Fig. 9.

It will be observed that when inserting the ring 29 in the mold 34 its outer cylindrical surface 35 is pressed against the plane base surface 36 of the groove 33, and, as successive parts of the ring are forced into the groove in the mold, all parts of this surface 35 will be pressed into contact with the surface 36 of the groove as the plane lateral surfaces 31, 32 of the ring are deformed so as to be brought into snug contact with the inner and outer cylindrical surfaces 37, 38 of the groove. In thus forcing the ring 29 into the groove 33 of the mold, every part thereof is turned through an angle of 90 degrees about an incremental axis so disposed that the elements of the fabric layers which extend axially in the ring 29 will be so positioned as to have their contacting surfaces lie in parallel planes perpendicular to the axis of the deformed ring, as indicated in Fig. 9.

The mold 34 is intended to be more or less diagrammatically representative of any mold having a groove within which the ring 29 may be inserted and deformed to cause its laminations to be perpendicular with respect to its axis, as indicated in Fig. 9.

Before vulcanizing or otherwise curing the ring 29 it may be pressed into the groove 33 of the mold by a flat cover plate, not shown, or, if desired, by an annular ring, not shown, having a flat lower surface and inner and outer diameters substantially conforming with those of the inner and outer surfaces 37, 38 of the mold, but affording a working clearance in order that said ring may be pressed into the groove 33 of the mold to an extent such as to compress the ring 29 to any desired degree before vulcanizing it.

After the ring has been deformed and pressed into the groove in the mold as above described, it may be vulcanized or cured to a degree of hardness dependent upon the character of rubber cement or other binding agent used and the degree of heat which is applied.

The packing ring constructed in accordance with the foregoing process will constitute a unitary structure all parts of which will be firmly united with one another.

The specific character of the fibrous fabric or other fibrous sheet material used in the construction of blanks from which packings made in accordance with the herein-disclosed invention may be produced may vary to suit different conditions of service to which the packing rings may be subjected. For example, asbestos fibre may be used in the construction of rings intended to be subjected to high degrees of temperature, whereas fibres of other character may be used in constructing rings to be subjected to the action of acids or of certain types of oil or other materials.

In view of the distortion to which fabric, used in the manufacture of packings in accordance with the herein-disclosed invention, is subjected, such fabric should, preferably, be cut on the bias, and may have to be so cut when material of a relatively unyielding character is used.

The binding agent by which the fibrous material of the blanks is to be united may consist of rubber composition which may be vulcanized to produce a ring of desired physical characteristics by varying the proportions of parts of the vulcanizing compound and the degree of heat and pressure applied, or it may consist of some other plastic composition which may be cured by a process analogous to vulcanization; and wherever reference is made to "curable" material or to the "curing" of material throughout the specification and claims of this application, such terms are intended to include vulcanizable rubber composition and other analogous compositions which may be vulcanized or otherwise cured by some process similar to vulcanization.

It will be apparent that each of the blanks to be used in the making of a packing ring in accordance with the disclosed invention may be made by winding into an annulus of spirally coiled fabric a ribbon of such fabric of a width such as to produce a single blank, instead of first preparing a roll of such spirally wound material of a length such as to be subdivided into a plurality of blanks. It will also be obvious that the fabric used in making the blanks may be treated with the appropriate binding agent either before it is wound to form the blank or the roll from which blanks may be constructed, or that the binding material may be applied during the winding of the fabric.

The herein-disclosed invention is not intended to be limited to specific details of the process which have been resorted to by way of illustration, but should include modifications and variations thereof within the scope of the appended claims.

What is claimed is:

1. The method of making a laminated machinery packing ring which consists in producing an annular blank comprising a strip of fibrous fabric, treated with a curable binding agent, and spirally coiled into a roll having a plurality of layers each extending axially from one to another of a pair of spaced planes perpendicular to the axis of the blank; deforming the said blank as a unit, without otherwise disturbing the relative positions of its parts, by bending each part thereof, as a continuous, progressive, single, step, through an angle of 90 degrees about an incremental axis, the respective axes of the various increments being so positioned as to cause all layers of the coiled fabric to be shifted to positions such that their contacting surfaces will lie in parallel planes perpendicular to the axis of the resulting annular structure, whereby the oppositely disposed, lateral, plane surfaces of the original blank will be so shifted as to serve, respectively, as the inner and outer surfaces of the resulting product; and molding and curing the deformed ring to thereby convert it into a unitary packing element of desired form, size and hardness.

2. The method defined by claim 1, further characterized in that the curable binding agent to be used in the production of the annular blank shall be an unvulcanized rubber cement of a composition dependent upon the desired physical characteristics of the packing ring to be produced whereby the curing of the deformed and molded structure in order to firmly bind its constituent elements into a unitary product shall constitute a process of vulcanization.

WERTUS G. CURRENT.